E. G. WOODLEE.
SPRING WHEEL.
APPLICATION FILED DEC. 3, 1912.
1,063,100.
Patented May 27, 1913
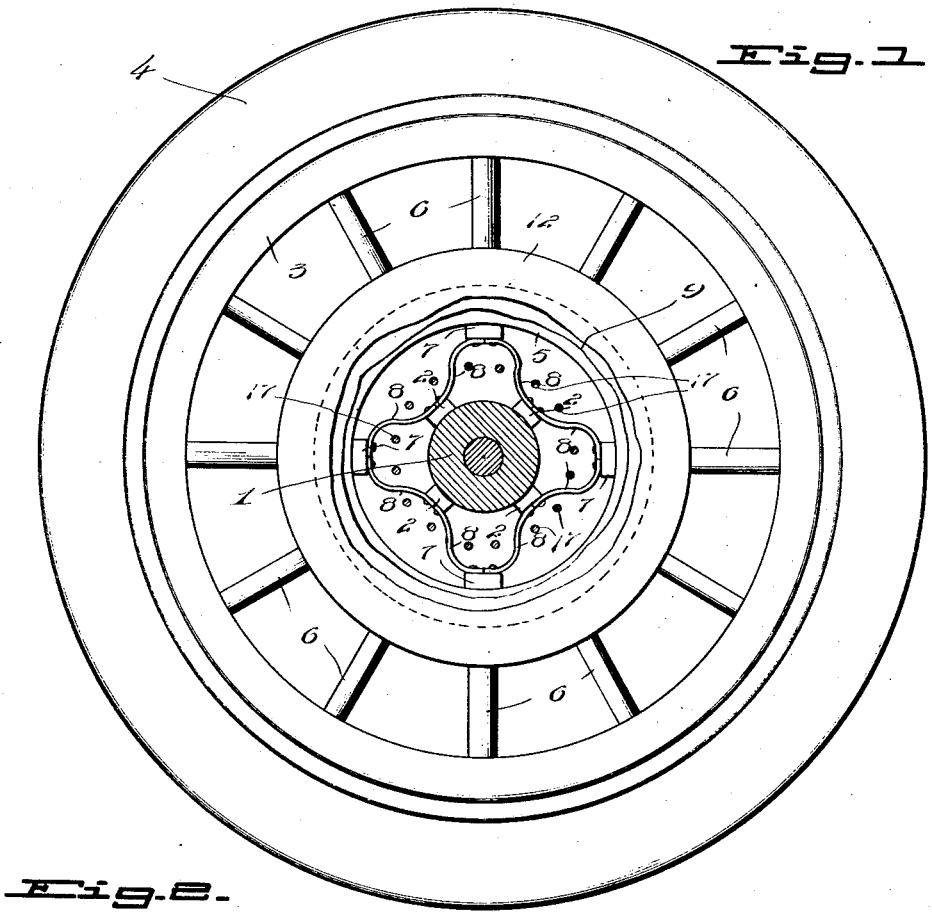
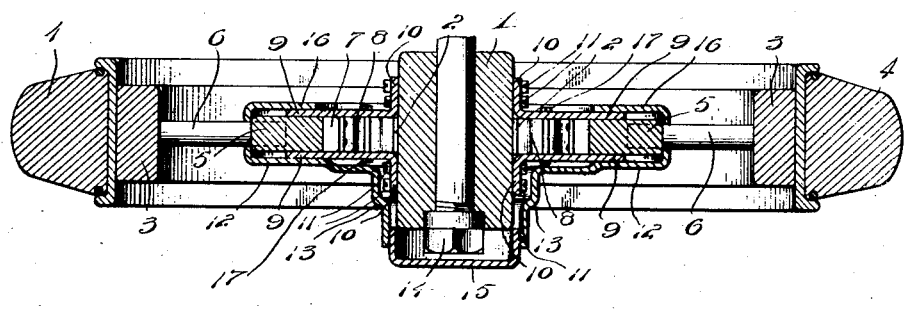
Witnesses
Chas. E. Kemper,
R. M. Smith.
Inventor
Elmer G. Woodlee.
By Victor J. Evans
Attorney

UNITED STATES PATENT OFFICE.

ELMER G. WOODLEE, OF ALTAMONT, TENNESSEE.

SPRING-WHEEL.

1,063,100.  Specification of Letters Patent.  Patented May 27, 1913.

Application filed December 3, 1912. Serial No. 734,733.

*To all whom it may concern:*

Be it known that I, ELMER G. WOODLEE, a citizen of the United States, residing at Altamont, in the county of Grundy and State of Tennessee, have invented new and useful Improvements in Spring-Wheels, of which the following is a specification.

This invention relates to spring wheels, the object in view being to do away with the pneumatic tire now in common use and the troubles incident to the use of such a tire, and provide means within the body of the wheel itself, whereby the resilient properties of the pneumatic tire are retained, while the tire is thoroughly protected from injury, the wheel being adapted for the use of a solid tire on the outer rim or felly thereof.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a wheel embodying the present invention. Fig. 2 is a diametrical section through the same.

The wheel contemplated in this invention comprises essentially a hub 1 provided at suitable intervals around the outer side thereof with spring-attaching bosses 2, the number of said bosses being in accordance with the number of springs to be employed, and the number of springs depending upon the load to be imposed upon the wheel.

The wheel also embodies a felly 3 adapted to receive the tire 4 of any suitable description, which is not liable to puncture. Within the felly 3 is an inner rim 5 which is rigidly connected to the felly 3 by means of spokes 6. Any desired number of spokes may be employed, in accordance with the work to be performed by the wheel.

The inner rim 5 is provided on its inner surface with inwardly extending bosses 7 corresponding in number with the number of bosses 2 on the hub, and arranged in staggered relation thereto, as shown in Fig. 1. Ogee-shaped springs 8 are connected at their outer and inner ends to the bosses 7 and 2, respectively, and serve to absorb all jar and vibration imparted to the wheel of the vehicle and prevent the same from being transmitted to the axle and body of the machine.

At opposite sides of the springs 8 are arranged spring housing plates 9, the same being provided at their inner ends with hub flanges 10 which encircle the hub 1, and are securely fastened thereto by cap screws 11 or their equivalent. At the outer side of the wheel, a disk shaped plate 12 is fastened, along its outer edge or margin, to the inner rim 5, the central portion of said plate being offset, as shown at 13, to fit around the end of the hub and the axle cap nut 14, said plate 12 having a detachable central cap 15 to give access to the cap nut 14 on the axle, for the purpose of lubricating the axle spindle or disconnecting the wheel as a whole from said spindle.

At the opposite side of the wheel is another housing plate 16 which is fastened to the opposite side of the rim 5, and extends inward in overlapping and telescopic relation to the housing plate 9 at the same side of the wheel.

From the foregoing description, it will be understood that the springs 8 which absorb the vibration between the wheel rim and the axle are included between and protected by the housing plates 9, 12, and 16, and that the plates 12 and 16, which are secured to the inner rim, bear a telescopic relation to the housing plates 9 which are secured directly to the hub 1. This allows the springs to act freely, while at the same time they are protected against the admission of dirt, dust, water, and other foreign matter.

The housing plates 9 may be further connected and relatively braced by bolts 17 extending through said plates and arranged between the springs 8, so as not to interfere with the proper action of the latter.

What is claimed is:

A spring wheel comprising a hub, radially projecting bosses thereon, a felly, an inner rim concentric with the felly, spokes rigidly connecting the felly and rim, bosses on the inner face of said rim arranged in staggered relation to the bosses on the hub and normally located beyond the outer extremities of the bosses on the hub, springs secured to the bosses of the rim and hub, spring housing plates having hub flanges encircling the hub and fastened thereto, and other housing plates secured to the inner rim and bearing a telescopic relation to the housing plates on the hub, each spring being of ogee shape and having one end fastened to one of the rim bosses and the other end fastened to one of the hub bosses, the outer extremities of the springs being butted together and the inner extremities thereof being also butted together, and all of the springs being normally located as an entirety between the inner extremities of the outer bosses and the outer extremities of the inner bosses.

In testimony whereof I affix my signature in presence of two witnesses.

ELMER G. WOODLEE.

Witnesses:
W. C. ABERNATHY,
E. C. SHELTON.